United States Patent
Cheng et al.

(10) Patent No.: US 12,108,196 B2
(45) Date of Patent: Oct. 1, 2024

(54) FRAME CORRECTION METHOD AND PROJECTOR USING THE SAME

(71) Applicant: Qisda Corporation, Taoyuan (TW)

(72) Inventors: Tsai-Hsu Cheng, Taoyuan (TW); Chih-Wei Cho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 66 days.

(21) Appl. No.: 18/105,188

(22) Filed: Feb. 2, 2023

(65) Prior Publication Data

US 2023/0412781 A1    Dec. 21, 2023

(30) Foreign Application Priority Data

Jun. 20, 2022    (CN) .......................... 202210699188.8

(51) Int. Cl.
*H04N 9/31* (2006.01)
(52) U.S. Cl.
CPC ................................. *H04N 9/3185* (2013.01)
(58) Field of Classification Search
CPC ............ G06T 2207/30204; G06T 2207/30208
See application file for complete search history.

(56) References Cited

U.S. PATENT DOCUMENTS

| | | | |
|---|---|---|---|
| 2014/0285725 A1* | 9/2014 | Furui | G03B 21/147 348/745 |
| 2017/0180689 A1* | 6/2017 | Morrison | H04N 9/3194 |
| 2022/0303512 A1* | 9/2022 | Chien | H04N 9/3182 |

FOREIGN PATENT DOCUMENTS

| WO | WO-2015016596 A1 * | 2/2015 | ........... G06K 9/4604 |
|---|---|---|---|
| WO | WO-2019195884 A1 * | 10/2019 | ............. G03B 17/54 |

\* cited by examiner

*Primary Examiner* — John W Miller
*Assistant Examiner* — Humam M Satti

(57) ABSTRACT

A frame correction method includes the following steps. Firstly, a correction frame is projected, wherein the correction frame has a number of original-boundary contour points. Then, in the first boundary contour adjustment, in response to a position adjustment of the first contour-adjusted one of the original-boundary contour points, correspondingly adjust the position of at least one symmetrical one of the original-boundary contour points, wherein at least one symmetrical one and the first contour-adjusted one are symmetrically disposed. Then, in response to the position adjustment of the first contour-adjusted one, a number of first new boundary contour points and a number of first open correction points are added.

20 Claims, 14 Drawing Sheets

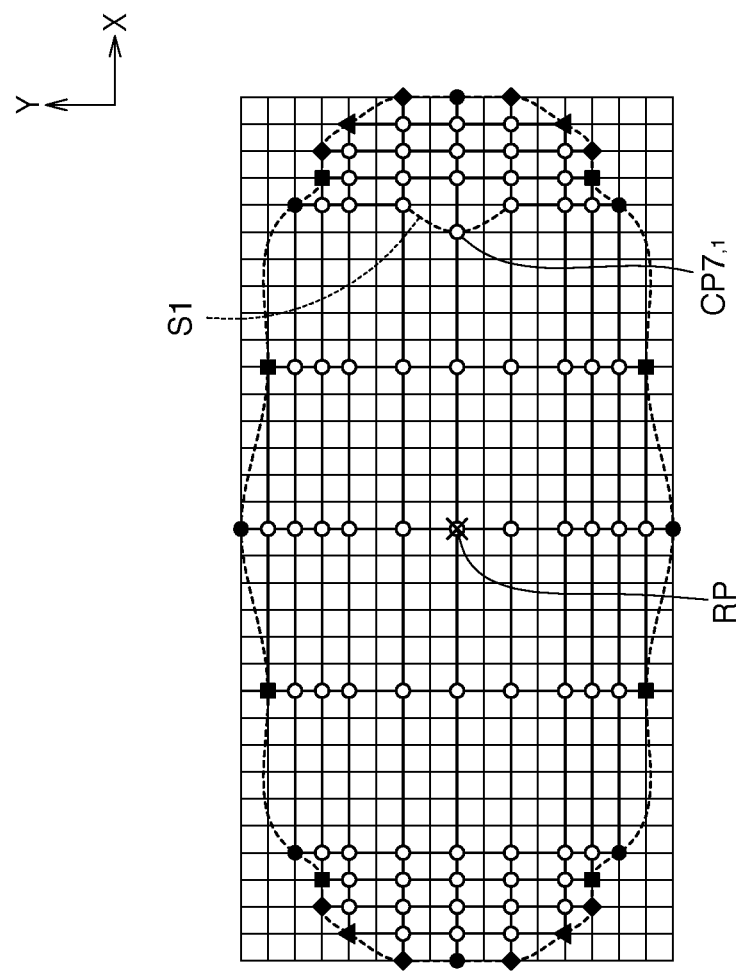

FRAME CORRECTION METHOD AND PROJECTOR USING THE SAME

This application claims the benefit of People's Republic of China application Serial No. 202210699188.8, filed on Jun. 20, 2022, the subject matter of which is incorporated herein by reference.

TECHNICAL FIELD

The disclosure relates in general to a frame correction method and a projector using the same.

BACKGROUND

A projector could project a projection image onto a projection surface. The projection surface is, for example, a planar surface or a non-planar surface (for example, convex, concave, or a combination thereof). When the projection image is projected onto the non-planar surface, the projection image will be distorted due to uneven contours of the non-planar surface. Therefore, it is an important issue for those skilled in the art to submit a frame correction method to make the frame suitable for displaying on a non-planar surface.

SUMMARY

According to an embodiment, a frame correction method is provided. The frame correction method include the following steps: projecting a correction frame, wherein the correction frame has a plurality of original-boundary contour points; in a first boundary contour adjustment, in response to a position adjustment of a first contour-adjusted one of the original-boundary contour points, correspondingly adjusting a position of at least one symmetric one of the original-boundary contour points, wherein the at least one symmetric one and the first contour-adjusted one are symmetrically disposed; and in response to the position adjustment of the first contour-adjusted one, adding a plurality of first added-boundary contour points and a plurality of first open correction points.

According to another embodiment, a projector is provided. The projector includes a projection module and a processor. The projection module is configured to project a projection image, wherein the projection image has a plurality of original-boundary contour points. The processor is configured to: in a first boundary contour adjustment, in response to a position adjustment of a first contour-adjusted one of the original-boundary contour points, correspondingly adjust a position of at least one symmetric one of the original-boundary contour points, wherein the at least one symmetric one and the first contour-adjusted one are symmetrically disposed; and in response to the position adjustment of the first contour-adjusted one, add a plurality of first added-boundary contour points and a plurality of first open correction points.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIGS. 3A to 3J are schematic diagrams of processes of the frame correction method of the projector of FIG. 1.

Figure 1:
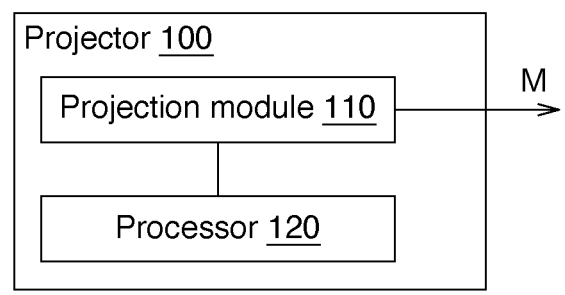
FIG. 1 is a schematic diagram of a projector according to an embodiment of the present invention.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Referring to FIG. 1, FIG. 1 is a schematic diagram of a projector 100 according to an embodiment of the present invention. The projector 100 includes a projection module 110 and a processor 120. The projection module 110 includes, for example, at least one optical lens, at least one light source, at least one color wheel and/or other elements required for projecting images. The processor 120 is, for example, a physical circuit formed by at least one semiconductor process.

The projection module 110 is configured to project a correction frame M, and the correction frame M has a number of original-boundary contour points. The processor 120 is configured to: (1). in response to a position adjustment of a first contour-adjusted one of the original-boundary contour points, correspondingly adjust a position of at least one symmetric one of the original-boundary contour points, wherein the at least one symmetric one and the first contour-adjusted one are symmetrically disposed; and (2). in response to the position adjustment of the first contour-adjusted one of the original-boundary contour points, add a number of added-boundary contour points and a number of open correction points. As a result, when the position of the first contour-adjusted one is adjusted, the position of the symmetric one symmetric to the first contour-adjusted one is automatically adjusted correspondingly and the related added-boundary contour points and the open correction points are added correspondingly, so the user does not need manually adjust multiple original-boundary contour points and manually add the open correction points, thereby effectively saving time for manual adjustment and/or adding image points. The "open correction points" herein refers to an image point that is open for the user to adjust the position.

In an embodiment, the position adjustment of the first contour-adjusted one is, for example, manually completed by the user. The projector 100 could provide a user interface, and the user operates the user interface to adjust the position of the first contour-adjusted one. The user interface is, for example, a physical key or keyboard or a virtual key.

Figure 2A:
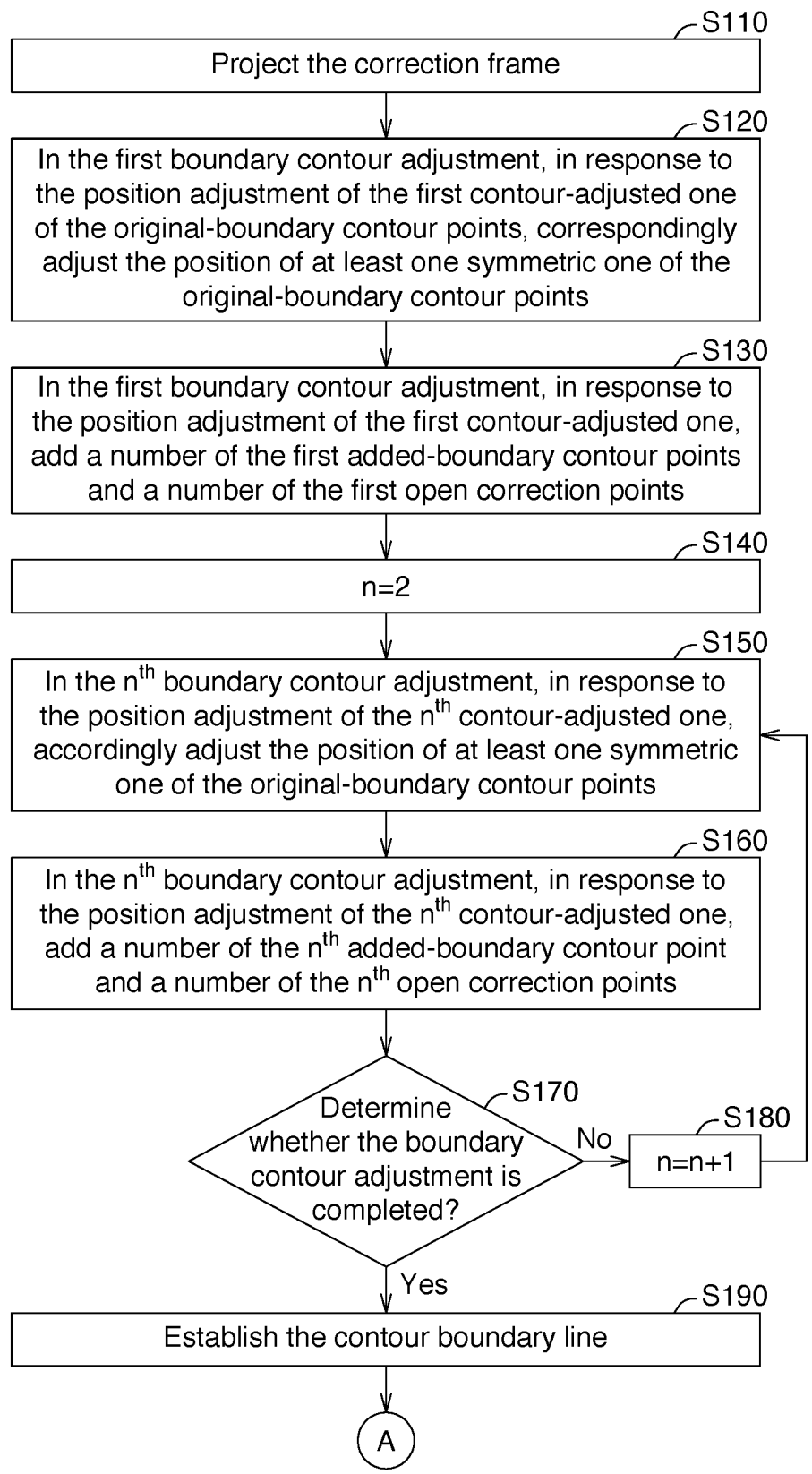
FIGS. 2A to 2B are schematic diagrams of flowcharts of the frame correction method of the projector of FIG. 1.
Figure 2B:
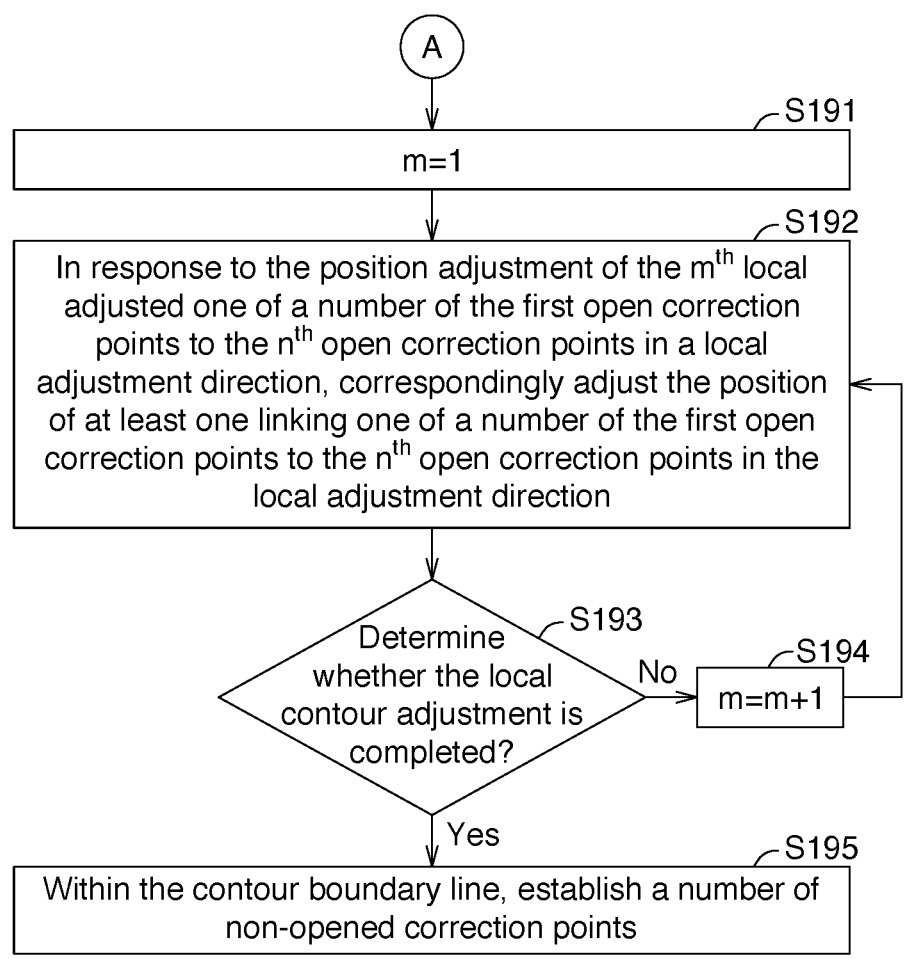

The frame correction method of the projector 100 is described with reference to FIGS. 2A to 2B and FIGS. 3A to 3J. FIGS. 2A to 2B are schematic diagrams of flowcharts of the frame correction method of the projector 100 of FIG. 1, and FIGS. 3A to 3J are schematic diagrams of processes of the frame correction method of the projector 100 of FIG. 1. FIGS. 3A to 3J show a number of cross grid-lines. However, the actual correction frame M could not display the grid-lines, or display the grid-lines. In addition, although the cross grid-lines shown in FIGS. 3A to 3J are all vertically interleaved, the actual extension pattern of the cross grid-lines could vary with the movement and/or the adding of image points (contour points, open correction points).

Figure 3A:
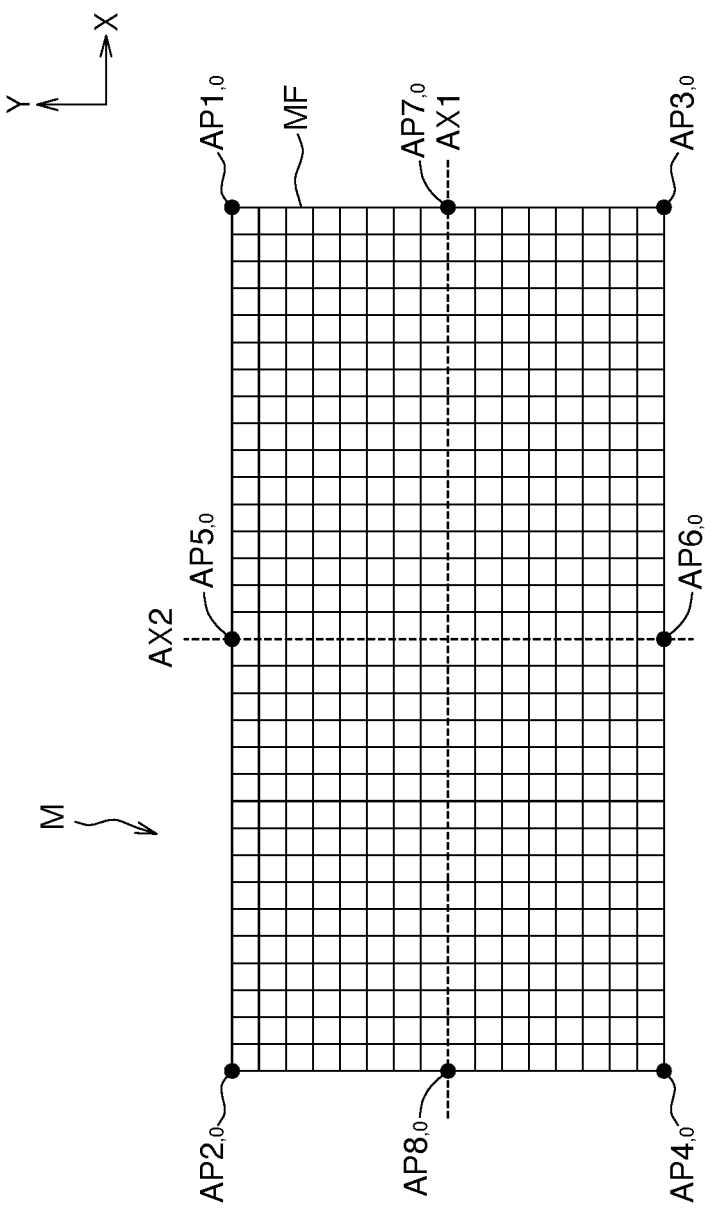

In step S110, as shown in FIG. 3A, the projection module 110 projects the correction frame M. The correction frame M has a number of the original-boundary contour points, for example, the original-boundary contour points $AP1_{,0}$ to $AP8_{,0}$. The original-boundary contour points $AP1_{,0}$ to $AP8_{,0}$ are distributed in a frame edge MF. The original-boundary contour points $AP1_{,0}$ to $AP8_{,0}$ and/or the frame edge MF could be actually displayed on the correction frame M. The number of the original-boundary contour points in the embodiment of the present invention is 8, for example; however, it could be less than or more than 8. The embodiment of the present invention does not limit the number of the original-boundary contour points. The position of the original-boundary contour point $AP1_{,0}$ shown in FIG. 3A is called "original position".

As shown in FIG. 3A, the original-boundary contour points $AP1_{,0}$ to $AP4_{,0}$, forming one symmetrical group, which are symmetrically disposed relative to a first center line AX1 and a second center line AX2. The original-boundary contour points $AP5_{,0}$ to $AP6_{,0}$, forming one symmetrical group, which are symmetrically disposed relative to the first center line AX1. The original-boundary contour points $AP7_{,0}$ to $AP8_{,0}$, forming one symmetrical group, which are symmetrically disposed relative to the second centerline AX2. The first center line AX1 and the second center line AX2 are substantially perpendicular to each other, and the intersection point thereof is, for example, a center point of the frame edge MF; however, such exemplification is not meant to be for limiting. The first center line AX1 is, for example, a horizontal line, and the second center line AX2 is, for example, a vertical line.

Figure 3B:
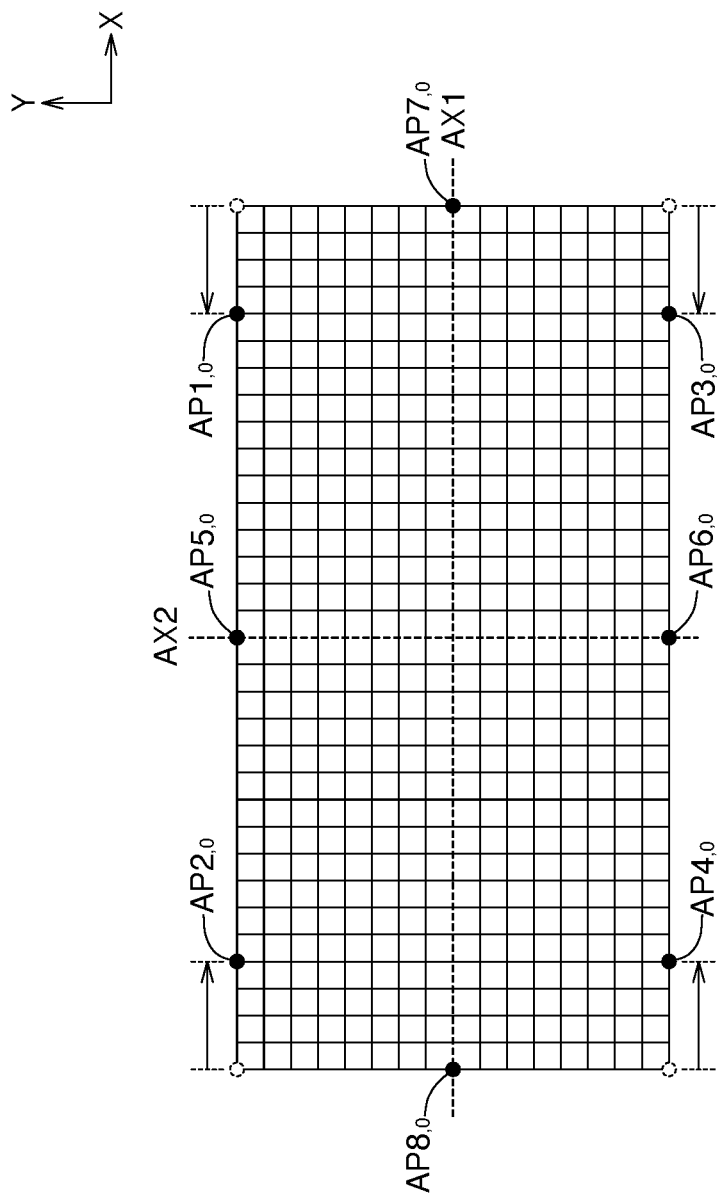

In step S120, as shown in FIG. 3B, in the first boundary contour adjustment, the processor 120, in response to the position adjustment of the first contour-adjusted one of the original-boundary contour points $AP1_{,0}$ to $AP8_{,0}$, correspondingly adjust the position of at least one symmetric one of the original-boundary contour points $AP1_{,0}$ to $AP8_{,0}$, wherein the at least one symmetric one and the first contour-adjusted one are symmetrically disposed.

As shown in FIG. 3B, in case of the first contour-adjusted one being the original-boundary contour point $AP1_{,0}$, the original-boundary contour points $AP2_{,0}$ to $AP4_{,0}$ and the original-boundary contour point $AP1_{,0}$ which are symmetric belong to the same symmetrical group. Thus, after the position adjustment of the original-boundary contour point $AP1_{,0}$, the processor 120 automatically adjusts the position of the original-boundary contour points $AP2_{,0}$ to $AP4_{,0}$, so that the adjusted original-boundary contour points $AP1_{,0}$ to $AP4_{,0}$ are still symmetrically disposed in position.

In another embodiment, in case of the first contour-adjusted one being the original-boundary contour point $AP5_{,0}$, the original-boundary contour point $AP6_{,0}$ and the original-boundary contour point $AP5_{,0}$ which are symmetric belong to the same symmetrical group. Thus, after the position adjustment of the original-boundary contour point $AP5_{,0}$, the processor 120 automatically adjusts the position of the original-boundary contour point $AP6_{,0}$, so that the adjusted original-boundary contour points $AP5_{,0}$ to $AP6_{,0}$ are still symmetrically disposed in position. In other embodiments, in case of the first contour-adjusted one being the original-boundary contour point $AP7_{,0}$, the original-boundary contour point $AP8_{,0}$ and the original-boundary contour point $AP7_{,0}$ which are symmetric belong to the same symmetrical group. Thus, after the position adjustment of the original-boundary contour point $AP7_{,0}$, the processor 120 automatically adjusts the position of the original-boundary contour point $AP8_{,0}$, so that the adjusted original-boundary contour points $AP7_{,0}$ to $AP8_{,0}$ are still symmetrically disposed in position.

The aforementioned symmetry approach is referred to herein as "four-quadrant symmetry." The processor 120 could implement "four-quadrant symmetry" by using image processing technology. For example, the processor 120 could modify the coordinate values of the original-boundary contour points, and the projection module 110 projects the original-boundary contour points whose coordinate values are adjusted on the correction frame M, so as to display the changes of the positions of the original-boundary contour points on the correction frame M. However, as long as the position of the original-boundary contour point could be displayed, the embodiments of the present disclosure are not limited to the technique of implementing "four-quadrant symmetry", and even such technique could be any suitable conventional technique. In addition, the change of the position point (or adjustment) of the image points (contour points, open correction points) in this description could be realized by using the above-mentioned image processing method, and the similarities will not be repeated hereafter.

Figure 3C:
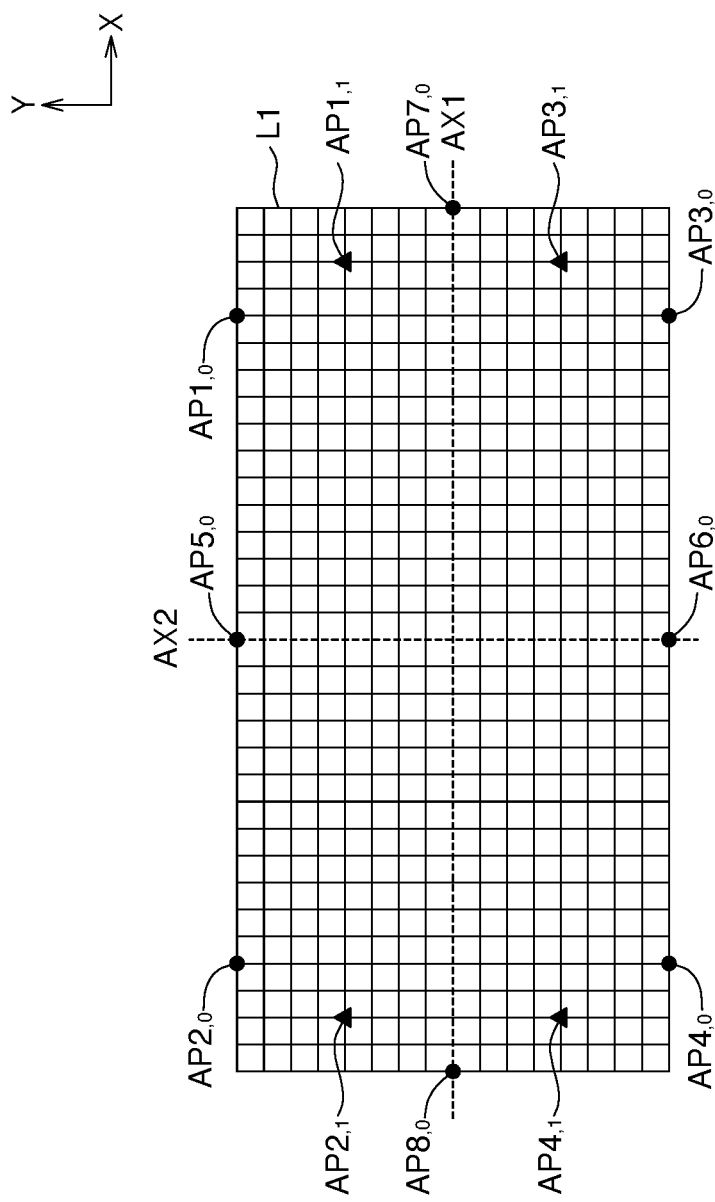

In step S130, as shown in FIG. 3C, the processor 120, in response to the position adjustment of the first contour-adjusted one, adds a number of the first added-boundary contour points and a number of the first open correction points. The added-boundary contour points and the first open correction points are automatically added in response to the position adjustment of the first contour-adjusted one, and such process is referred to as "automatic expansion" herein.

The "automatic expansion" is further described below with reference to FIGS. 3C to 3E.

As shown in FIG. 3C, when the position of the first contour-adjusted one in a boundary contour adjustment direction, the processor 120 adds an added one of the first added-boundary contour points between the first contour-adjusted one and the adjacent original-boundary contour point, wherein the adjacent original-boundary contour point is closest to the first contour-adjusted one in an added direction, and the added direction is perpendicular to the boundary contour adjustment direction.

In case of the first contour-adjusted one being the original-boundary contour point $AP1_{,0}$, based on the position of the original-boundary contour point $AP1_{,0}$ being adjusted in X axis (for example, the boundary contour adjustment direction), the processor 120 adds the first added-boundary contour point (the added one) $AP1_{,1}$ (the subscript "1" indicates that "the first" boundary contour adjustment, and so on) between the original-boundary contour point $AP1_{,0}$ and the adjacent original-boundary contour point $AP7_{,0}$, wherein the adjacent original-boundary contour point $AP7_{,0}$ is closest to the original-boundary contour point $AP1_{,0}$ in Y axis (the added direction). In an embodiment, the boundary contour adjustment direction could be parallel to one of the X axis and the Y axis.

In addition, the processor 120 could add the first added-boundary contour point by using the image processing technology. For example, the processor 120 could set the coordinate value of the first added-boundary contour point, and the projection module 110 could project the first added-boundary contour point on the correction frame M according to the set coordinate value. The method of adding image points described herein is the same as or similar to that of the first added-boundary contour point, and the similarities will not be repeated here.

As shown in FIG. 3C, in the present embodiment, in the boundary contour adjustment direction (for example, the X axis), the coordinate of the first added-boundary contour point $AP1_{,1}$ (the added one) is equal to the average (that is, the median value) of the original-boundary contour point $AP1_{,0}$ (the first contour-adjusted one) and the adjacent original-boundary contour point $AP7_{,0}$, and in the added direction (for example, Y axis), the coordinate of the first added-boundary contour point AP1, 1 (the added one) is equal to the average (that is, the median value) of the original-boundary contour point $AP1_{,0}$ (the first contour-adjusted one) and the adjacent original-boundary contour point $AP7_{,0}$.

As shown in FIG. 3C, the processor 120 adds the rest ones $AP2_{,1}$ to $AP4_{,1}$ of the added-boundary contour points $AP1_{,1}$ to AP4,1, wherein the added-boundary contour points $AP1_{,1}$ to $AP4_{,1}$ are symmetrically disposed relative to the first center line AX1 and the second center line AX2. In other words, the processor 120 adds the rest ones $AP2_{,1}$ to $AP4_{,1}$ of the added-boundary contour points $AP1_{,1}$ to $AP4_{,1}$ by using way of the four-quadrant symmetry and the image processing technology, wherein all first added-boundary contour points $AP1_{,1}$ to $AP4_{,1}$ are symmetrically disposed relative to the first center line AX1 and the second center line AX2.

In addition, the automatic position adjustment step (as shown in FIG. 3B) of the aforementioned original-boundary contour points $AP2_{,0}$ to $AP4_{,0}$ and the automatic adding step (as shown in FIG. 3C) of the first added-boundary contour points $AP1_{,1}$ to $AP4_{,1}$ could be performed simultaneously or sequentially.

In addition, the processor 120 is further configured to: (1). establish a number of first added-boundary contour point lines, wherein each first added-boundary contour point line connects the opposite two added-boundary contour points; (2). establish a number of first original-boundary contour point lines, wherein each first original-boundary contour point line connects the opposite two original-boundary contour points; (3). establish a number of the first open correction points at intersections of the first added-boundary contour point lines and the first original-boundary contour point lines.

Figure 3D:
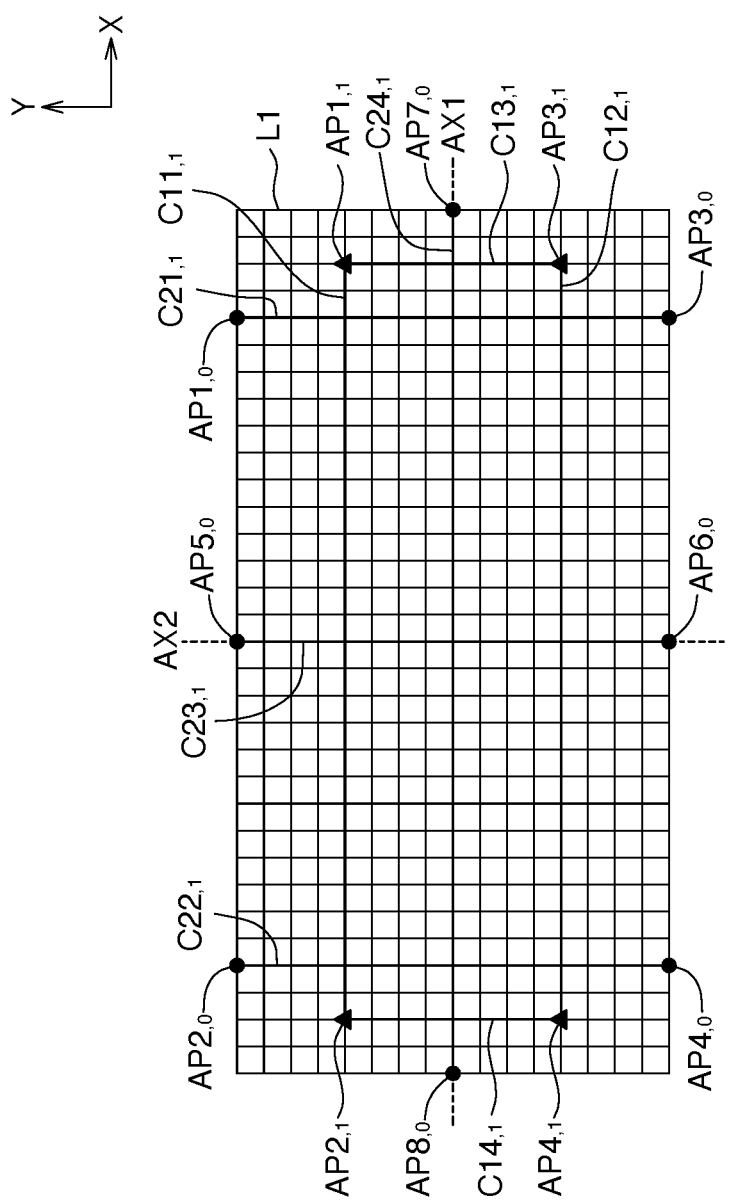

For example, as shown in FIG. 3D, the processor 120 establishes a number of the first added-boundary contour point lines $C11_{,1}$-$C14_{,1}$ (the subscript "1" indicates the boundary contour adjustment for the first time, and so on), wherein the first added-boundary contour point line $C11_{,1}$ connects the opposite two first added-boundary contour points $AP1_{,1}$ and AP2,1, the first added-boundary contour point line $C12_{,1}$ connects the opposite two first added-boundary contour points $AP3_{,1}$ and AP4,1, the first added-boundary contour point line $C13_{,1}$ connects the opposite two first added-boundary contour points $AP1_{,1}$ and AP3,1, the first added-boundary contour point line $C14_{,1}$ connects the opposite two first added-boundary contour points $AP2_{,1}$ and AP4,1. In addition, the processor 120 establishes a number of the first original-boundary contour point lines $C21_{,1}$ to C24,1, wherein the first original-boundary contour point line $C21_{,1}$ connects the opposite two original-boundary contour points $AP1_{,0}$ and $AP3_{,0}$, the first original-boundary contour point line $C22_{,1}$ connects the opposite two original-boundary contour points $AP2_{,0}$ and $AP4_{,0}$, the first original-boundary contour point line $C23_{,1}$ connects the opposite two original-boundary contour points $AP3_{,0}$ and $AP6_{,0}$, and the first original-boundary contour point line $C24_{,1}$ connects the opposite two original-boundary contour points $AP7_{,0}$ and $AP8_{,0}$. The first added-boundary contour point lines and the first original-boundary contour point lines could be displayed on the correction frame M, or could not be displayed.

As shown in FIG. 3D, each original-boundary contour point line connects the opposite two original-boundary contour points either along the first center line AX1 or along the second center line AX2. In addition, all of the first added-boundary contour point lines and the first original-boundary contour point lines could connect all of the original-boundary contour points and the added-boundary contour points. In an embodiment, the adding step of the first added-boundary contour point lines and the adding step of the first original-boundary contour point lines could be completed simultaneously or sequentially.

Figure 3E:
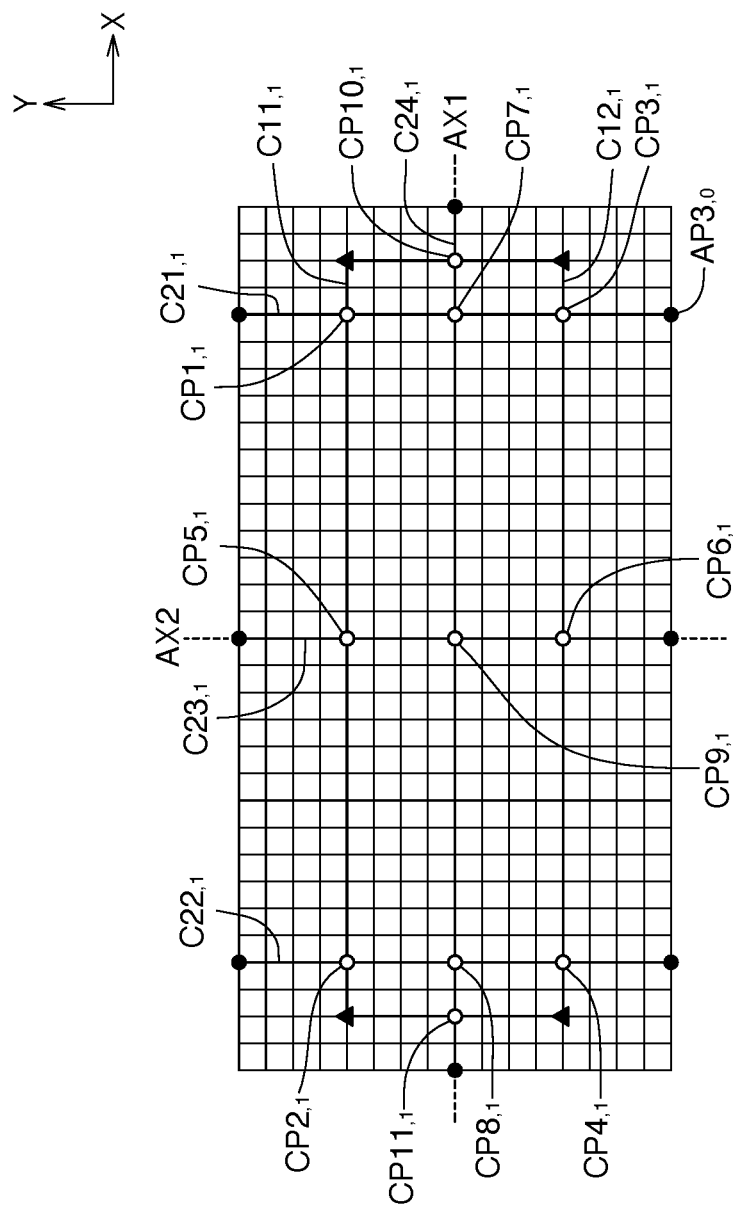

As shown in FIG. 3E, after the added-boundary contour point lines and the original-boundary contour point lines are completed, the processor 120 establish a number of the first open correction points $CP1_{,1}$ to $CP14_{,1}$ at the intersections of the first added-boundary contour point lines $C11_{,1}$ to $C14_{,1}$ and the first original-boundary contour point lines $C21_{,1}$ to C24,1, wherein the first open correction points $CP1_{,1}$ to $CP11_{,1}$ are symmetrically disposed relative to the first centerline AX1 and the second centerline AX2. The first open correction points $CP1_{,1}$ to $CP11_{,1}$ could be displayed on the correction frame M. In addition, two of the adding steps of the first added-boundary contour point lines, the adding step of the first original-boundary contour point lines and the adding step of the first open correction points could be performed simultaneously or sequentially.

In the next ($n \geq 2$) boundary contour adjustment, the user could further perform position adjustment for the $n^{th}$ contour-adjusted one of the original-boundary contour points and the $n^{th}$ added-boundary contour point to the $(n-1)^{th}$ added-boundary contour point, and the processor 120, in response to the position adjustment of the $n^{th}$ contour-adjusted one, automatically performs the aforementioned "four-quadrant symmetry" and "automatic expansion" by using could use the same method described above. The aforementioned value of n could range between 2 and N, wherein n is a positive integer, and N is a positive integer equal to or greater than 2. The embodiment of the present invention does not limit the value of N, which could be a positive integer ranging between 2 and 100, or even more, and its value depends on the time number of adjustments made by the user.

When the first boundary contour adjustment meets the user's requirements, the user could end the boundary contour adjustment step, and the process proceeds directly to step S190 from step S130. In addition, the user could input an end command of the boundary contour adjustment through the user interface. The processor 120, in response to the end command of the boundary contour adjustment, makes the process proceed to step S190. If the user wants to continue to adjust the boundary contour for the second time, the process proceeds to step S140.

In step S140, the processor 120 sets n=2.

Figure 3F:
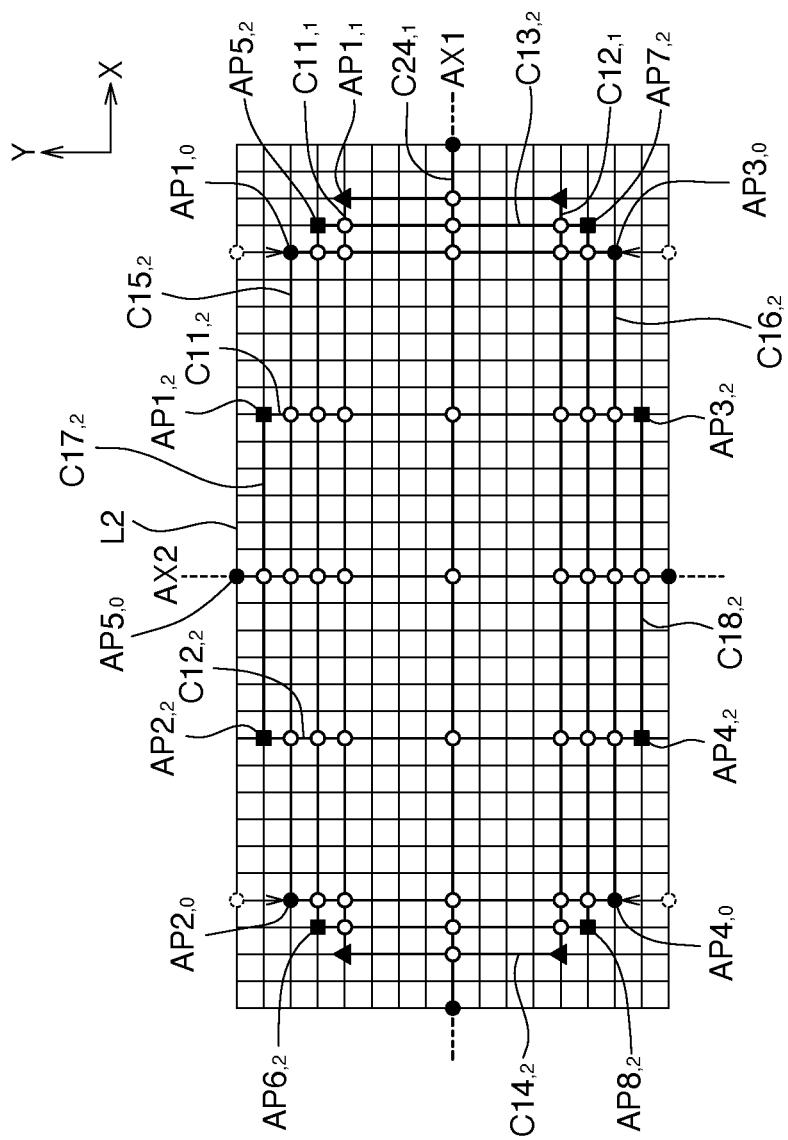

In step S150, as shown in FIG. 3F, in the $2^{nd}$ boundary contour adjustment, the processor 120, in response to the position adjustment of a second contour-adjusted one of the original-boundary contour points $AP1_{,0}$ to $AP8_{,0}$ and the first added-boundary contour points $AP1_{,1}$ to $AP4_{,1}$, accordingly adjusts the position of at least one symmetric one of the original-boundary contour points $AP1_{,0}$ to $AP8_{,0}$ and the first added-boundary contour points AP1 to $AP4_{,1}$, wherein the at least one symmetric one and the second contour-adjusted one are symmetrically disposed ("four-quadrant symmetry"). The position adjustment of the second contour-adjusted one is, for example, done manually by the user, which is similar to or the same as the aforementioned position adjustment of the first contour-adjusted one, and similarities will not be repeated here.

In case of the second contour-adjusted one being the original-boundary contour point $AP1_{,0}$, as shown in FIG. 3F, the original-boundary contour points $AP2_{,0}$ to $AP4_{,0}$ and the original-boundary contour point $AP1_{,0}$ which are symmetric belong to the same symmetrical group. Thus, after the position adjustment of the original-boundary contour point $AP1_{,0}$, the processor 120 automatically adjusts the positions of the original-boundary contour points $AP2_{,0}$ to $AP4_{,0}$, so that the adjusted original-boundary contour points $AP1_{,0}$ to $AP4_{,0}$ are still symmetrically disposed in position.

In step S160, in the $2^{nd}$ boundary contour adjustment, the processor 120, in response to the $2^{nd}$ boundary contour adjustment, adds a number of the second added-boundary contour points and a number of the second open correction points ("automatic expansion"). When the position of the second contour-adjusted one is adjusted in a boundary contour adjustment direction, the processor 120 adds an added one of second added-boundary contour points between the second contour-adjusted one and an adjacent one of the $AP1_{,0}$ to $AP8_{,0}$ and the first added-boundary contour points $AP1_{,1}$ to $AP4_{,1}$, wherein the adjacent original-boundary contour point is the original-boundary contour point that is closest to the second contour-adjusted one in the added direction, and the added direction and the boundary contour adjustment direction are substantially perpendicular to each other.

In case of the original-boundary contour point $AP1_{,0}$ being the second contour-adjusted one, as shown in FIG. 3F, based on the position of the original-boundary contour point $AP1_{,0}$ being adjusted in Y axis (for example, the boundary contour adjustment direction), the processor 120 adds a second added-boundary contour point $AP1,2$ (the added one) between the original-boundary contour point $AP1_{,0}$ (the second contour-adjusted one) and the original-boundary contour point $AP5_{,0}$ (the adjacent one), and adds a second added-boundary contour point $AP5_{,2}$ (the added one) between the original-boundary contour point $AP1_{,0}$ and the first added-boundary contour point $AP1_{,1}$ (the adjacent one), wherein the adjacent original-boundary contour point $AP5_{,0}$ is closest to the original-boundary contour point $AP1_{,0}$ in X axis (the added direction) and located at an side of the original-boundary contour point $AP1_{,0}$, while the adjacent first added-boundary contour point $AP1_{,1}$ is closest to the original-boundary contour point $AP1_{,0}$ in X axis (the added direction) and located at an opposite side of the original-boundary contour point $AP1_{,0}$. In other words, the processor 120 adds two second added-boundary contour points $AP1_{,2}$ and $AP5_{,2}$ respectively at two opposite sides of the original-boundary contour point $AP1_{,0}$ (the second contour-adjusted one) in the added direction.

To sum up, when $n^{th}$ contour-adjusted one is adjusted in the boundary contour adjustment direction, the processor 120 adds a contour point (the added one) in the added direction perpendicular to the boundary contour adjustment direction.

As shown in FIG. 3F, the processor 120 adds the rest ones $AP2,2$ to $AP8,2$ of the second added-boundary contour points $AP1,2$ to $AP8,2$, wherein the second added-boundary contour points $AP1,2$ to $AP8,2$ are symmetrically disposed relative to the first centerline AX1 and the second centerline AX2. In other words, the processor 120 adds the rest ones $AP2,2$ to $AP8,2$ of the second added-boundary contour points $AP1,2$ to $AP8,2$ by using way of the four-quadrant symmetry and the image processing technology, wherein all second added-boundary contour points $AP1,2$ to $AP8,2$ are symmetrically disposed relative to the first center line AX1 and the second center line AX2.

In addition, the automatic position adjustment step (as shown in FIG. 3F) of the aforementioned original-boundary contour points $AP2_{,0}$ to $AP4_{,0}$ and the automatic adding step (as shown in FIG. 3F) of the second added-boundary contour points $AP1_{,2}$ to $AP8_{,2}$ could be performed simultaneously or sequentially.

In addition, the processor 120 is further configured to: (1) establish a number of the $n^{th}$ added-boundary contour point lines, wherein each $n^{th}$ added-boundary contour point line connects opposite two $n^{th}$ added-boundary contour points; (2). establish a number of the $n^{th}$ open correction points at the intersections of the $n^{th}$ added-boundary contour point lines and the $(n-1)^{th}$ added-boundary contour point lines and/or the $(n-1)^{th}$ original-boundary contour point lines, wherein the added-boundary contour point lines are perpendicular to the original-boundary contour point lines. In the present embodiment, the second open correction points could be established at the intersections of the first original-boundary contour point lines and/or the $(n-1)^{th}$ added-boundary contour point lines that are intersected with all $n^{th}$ added-boundary contour point lines.

For further example, as shown in FIG. 3F, the processor 120 establishes a number of the second added-boundary contour point lines $C11_{,2}$ to $C18_{,2}$, wherein the second added-boundary contour point line $C11_{,2}$ connects the opposite two second added-boundary contour points $AP1_{,2}$ and $AP3_{,2}$, the second added-boundary contour point line $C12_{,2}$ connects the opposite two second added-boundary contour points $AP2_{,2}$ and $AP4_{,2}$, the second added-boundary contour point line $C13_{,2}$ connects the opposite two second added-boundary contour points $AP5_{,2}$ and $AP7_{,2}$, the second added-boundary contour point line $C14_{,2}$ connects the opposite two second added-boundary contour points $AP6_{,2}$ and $AP8_{,2}$, the second added-boundary contour point line $C15_{,2}$ connects the opposite two second added-boundary contour points $AP5_{,2}$ and $AP6_{,2}$, the second added-boundary contour point line $C16_{,2}$ connects the opposite two second added-boundary contour points $AP7_{,2}$ and $AP8_{,2}$, the second added-boundary contour point line $C17_{,2}$ connects the opposite two second added-boundary contour points $AP1_{,2}$ and $AP2_{,2}$, and the second added-boundary contour point line $C18_{,2}$ connects the opposite two second added-boundary contour points $AP3_{,2}$ and $AP4_{,2}$. In addition, the processor 120 establishes a number of the second open correction points (unlabeled, drawn as hollow circles) at intersections of the second added-boundary contour point lines $C11_{,2}$ to $C18_{,2}$ and the first added-boundary contour point lines $C11_{,1}$ to $C12_{,1}$, and establishes a number of the second open correction points (unlabeled, drawn as hollow circles) at intersections of the second added-boundary contour point lines $C11_{,2}$ to $C18_{,2}$ and the original-boundary contour point line $C24_{,1}$. The second open correction points are symmetrically disposed relative to the first center line AX1 and the second center line AX2 ("four-quadrant symmetry").

In step S170, the processor 120 determines whether the boundary contour adjustment is completed. When the boundary contour adjustment is completed, the process proceeds to step S190. When the boundary contour adjustment is not completed, the process proceeds to step S180, and the processor 120 accumulates the value of n (namely, n=n+1), and then the process returns to step S150 to continue the next boundary contour adjustment. In addition, the processor 120, in response to the end command, the user could end the boundary contour adjustment step, such end command is provided through the aforementioned user interface.

Figure 3G:
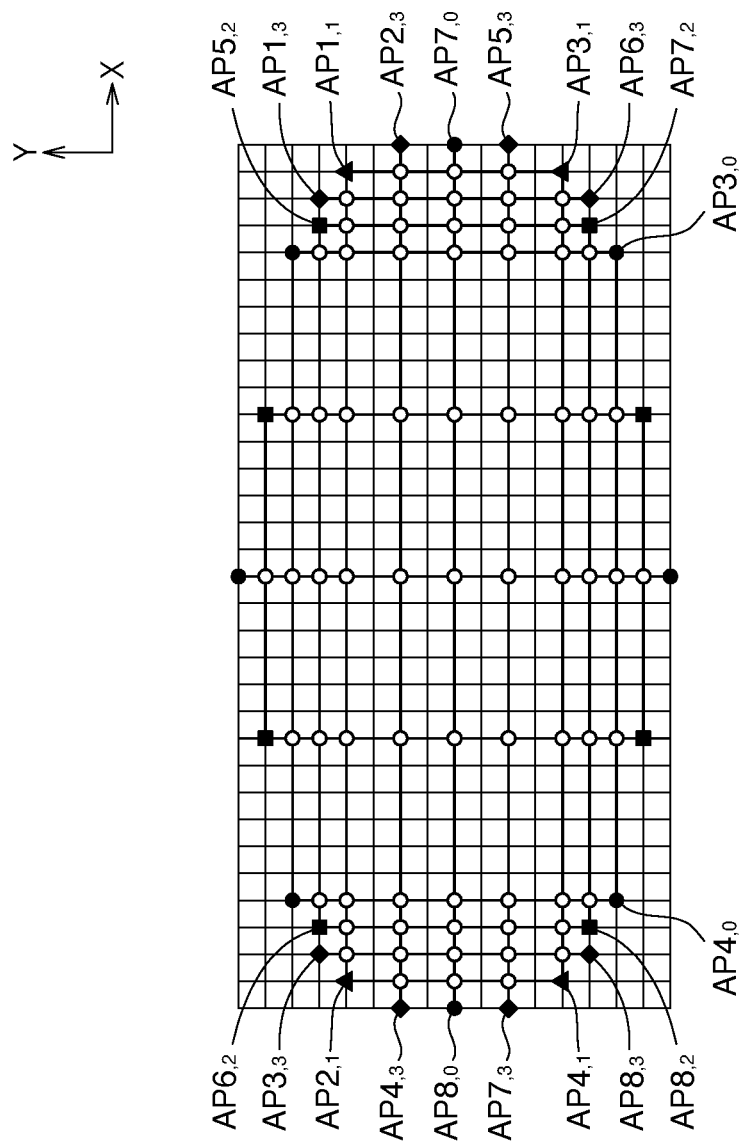

As shown in FIG. 3G, in the $3^{rd}$ (n=3) boundary contour adjustment, the processor 120, in response to the position adjustment of a third contour-adjusted one (for example, the second added-boundary contour point $AP1,1$) of the original-boundary contour points $AP1_{,0}$ to $AP8_{,0}$, the first added-boundary contour points $AP1_{,1}$ to $AP4_{,1}$ and the second added-boundary contour points $AP1_{,2}$ to $AP8_{,2}$, accordingly adjusts the position of at least one symmetric one (for example, the second added-boundary contour points $AP2_{,2}$, $AP3_{,2}$ and $AP4_{,2}$) of the original-boundary contour points $AP1_{,0}$ to $AP8_{,0}$, the first added-boundary contour points $AP1_{,1}$ to $AP4_{,1}$ and the second added-boundary contour points $AP1_{,2}$ to $AP4_{,2}$ by using the four-quadrant symmetry, wherein at least one symmetric one and the second contour-adjusted one are symmetrically disposed.

As shown in FIG. 3G, in the $3^{rd}$ (n=3) boundary contour adjustment, the processor 120, in response to the position adjustment of the third contour-adjusted one (for example, the added-boundary contour point $AP1_{,2}$), adds a number of the third added-boundary contour points (for example, the third added-boundary contour points $AP1_{,3}$ to $AP8_{,3}$) and a number of the third open correction points (unlabeled, drawn as hollow circles) by using the method of "automatic expansion". In the present embodiment, the intersection of the grid-lines in FIG. 3G represents a coordinate of one pixel, wherein the coordinate of the added-boundary contour point is based on the intersection of the grid-lines.

In summary, in the $n^{th}$ boundary contour adjustment, the processor 120, in response to the position adjustment of the $n^{th}$ contour-adjusted one of a number of the original-boundary contour points and a number of the first added-boundary contour points to a number of the $(n-1)^{th}$ added-boundary contour points, correspondingly adjusts at least one symmetric one of the original-boundary contour points and a number of the first added-boundary contour points to a number of the $(n-1)^{th}$ added-boundary contour points by using the "four-quadrant symmetry", wherein at least one symmetric one and the $n^{th}$ contour-adjusted one are symmetrically disposed. In addition, in the $n^{th}$ boundary contour adjustment, the processor 120, in response to the position adjustment of the $n^{th}$ contour-adjusted one of a number of the original-boundary contour points and a number of the first added-boundary contour points to a number of the $(n-1)^{th}$ added-boundary contour points, adds a number of the $n^{th}$ added-boundary contour points and a number of the $n^{th}$ open correction points by "automatic expansion".

In addition, in the $n^{th}$ boundary contour adjustment, in response to the position adjustment of the $n^{th}$ contour-adjusted one, at least two of "automatic position adjustment of at least one symmetrical one", "the adding of a number of the $n^{th}$ added-boundary contour points" and "adding of a number of the $n^{th}$ open correction points" could be completed simultaneously or not at the same time. In addition, if the $n^{th}$ added-boundary contour points in the $n^{th}$ boundary contour adjustment has been established (existed) during the first boundary contour adjustment to the $(n-1)^{th}$ boundary contour adjustment, the establishing step of $n^{th}$ added-boundary contour point could be omitted. In addition, in an embodiment, a linking relationship between a released one of a number of the original-boundary contour points and a number of the first added-boundary contour points to a number of the $n^{th}$ added-boundary contour points and the others of a number of the original-boundary contour points and a number of the first added-boundary contour points to a number of the $n^{th}$ added-boundary contour points could be released. For example, the processor 120, in response to the secondary position adjustment of the released one by the user, releases the linking relationship between the released one and the others. After the linking relationship is released, the released one does not move/change with other contour points and/or other contour points do not move/change with the released one. Furthermore, when the user adjusts the position of the added-boundary contour point $AP1_{,1}$ (the released one) of FIG. 3G, then adjusts the position of the added-boundary contour point $AP1_{,3}$, and then again adjusts the position of the added-boundary contour point $AP1_{,1}$, the processor 120 releases the linking relationship between the added-boundary contour point $AP1_{,1}$ (the released one) and other contour points (all contour points rather than the released one).

Figures 1, 3H:
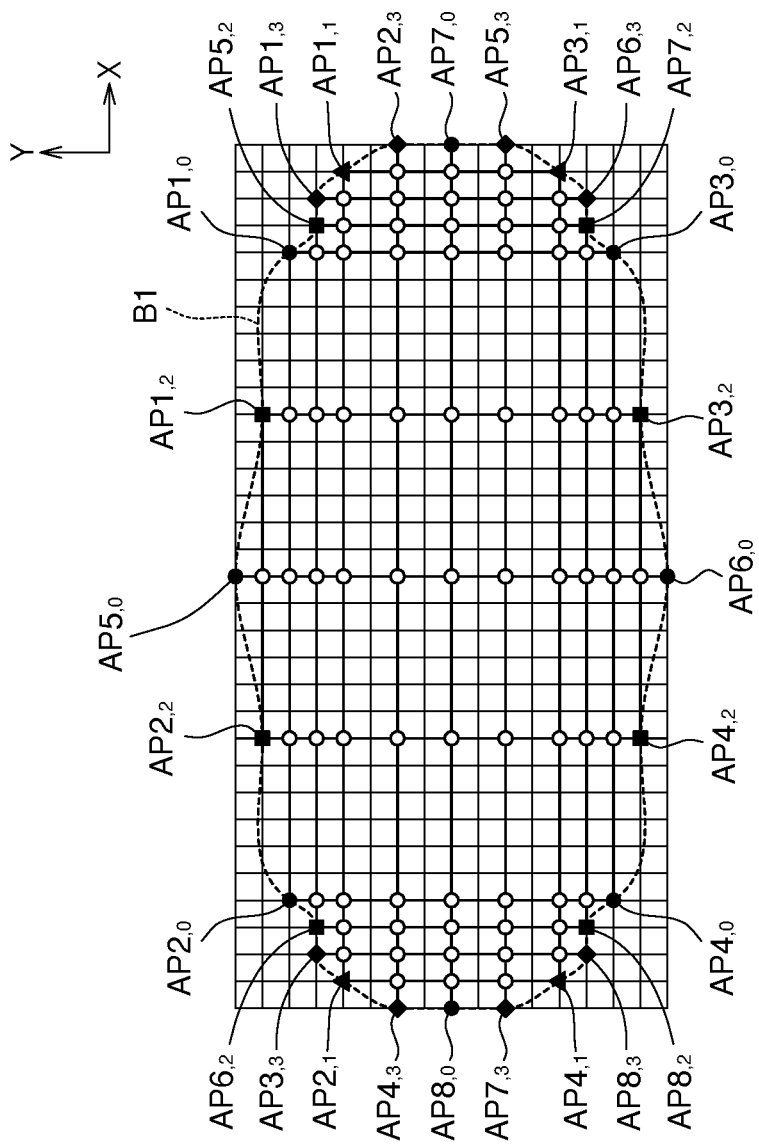
Figures 2, 3H:
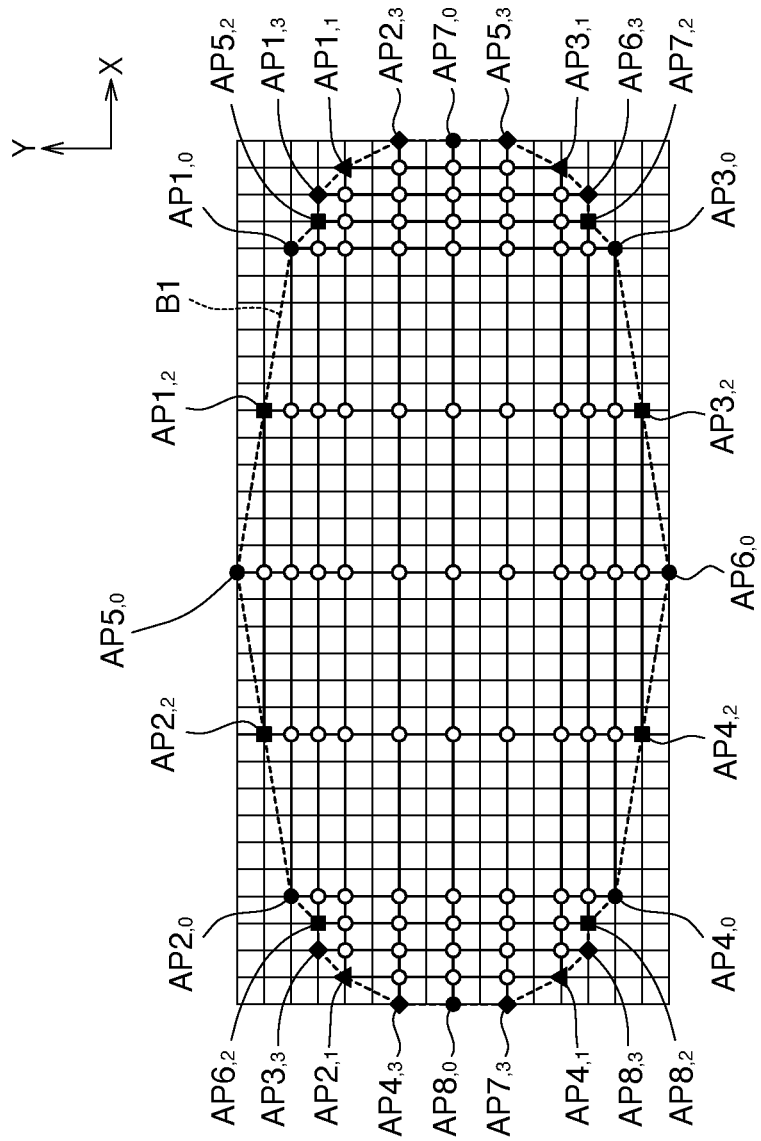

In step S190, as shown in FIG. 3H-1, after the adjustment of the contour points is completed, the processor 120 could generate (or establish) a contour boundary line B1, wherein the contour boundary line B1 connects or approaches any one of all boundary contour points, such as anyone of original-boundary contour points $AP1_{,0}$ to $AP8_{,0}$ and the first added-boundary contour points $AP1_{,1}$ to $AP4_{,1}$ to the $n^{th}$ added-boundary contour points (for example, $AP1_{,2}$ to $AP8_{,2}$ and $AP1,3$ to $AP8,3$). The contour boundary line B1 could be displayed on the correction frame M. In addition, the processor 120 could generate the contour boundary line B1 by using, for example, a straight-line compensation method and/or a curved-line compensation method. For example, as shown in FIG. 3H-1, the contour boundary line B1 is a straight line. For another example, as shown in FIG. 3H-2, the contour boundary line B1 is a curved line. In other embodiments, the contour boundary line B1 could be a combination of a straight line and a curved line. For example, two adjacent contour points are connected by a straight line, while another two adjacent contour points are connected by a curved line.

After the contour boundary line B1 is generated, the user could adjust the position of the open correction points within the contour boundary line B1 (hereinafter referred to as "local contour adjustment") to adjust the local contour within the contour boundary line B1 (or fine-tuning).

In step S191, the processor 120 sets m=1.

In step S192, in response to the position adjustment of the first local adjusted one (the $m^{th}$ local adjusted one) of a number of the first open correction points to the $n^{th}$ open correction points in a local adjustment direction, the processor 120 correspondingly adjusts the position of at least one linking one of a number of the first open correction points to the $n^{th}$ open correction points in the local adjustment direction, wherein the first local adjusted one and the at least one linking one are distributed in a distribution direction, the local adjustment direction is perpendicular to the distribution direction. In other words, when the position of the $m^{th}$ local adjusted one changes, the position of the linking one changes accordingly.

Figure 3I:
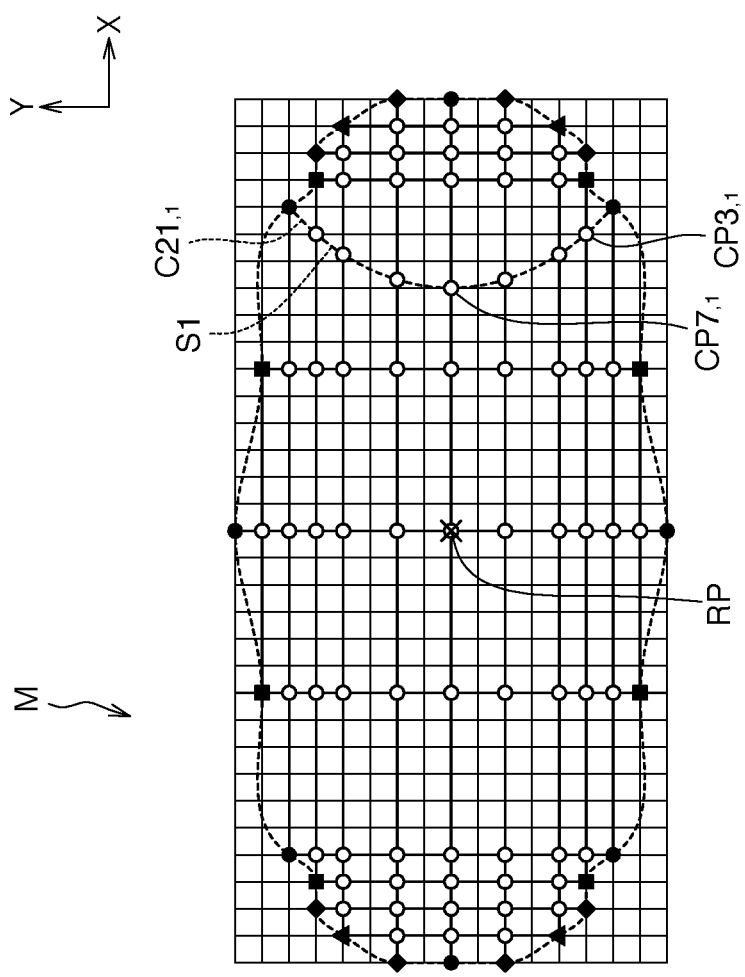

In case of the first local adjusted one being the first open correction points $CP7_{,1}$, the processor 120, in response to the position adjustment of the first open correction points $CP7_{,1}$ in the X-axis, correspondingly adjusts the positions of six open correction points (linking ones) on the first original-boundary contour point line $C21_{,1}$ (the first original-boundary contour point line $C21_{,1}$ is shown in FIG. 3E), wherein the linking ones are distributed in the Y-axis (perpendicular direction) (before the open correction points being correspondingly moved, as shown in FIG. 3I-1). In an embodiment, as shown in FIG. 3I, the first local adjusted one and the linking ones are distributed in a line segment S1, wherein the line segment S1 is, for example, along a straight line, a curved line or a combination thereof, wherein the curved line is, for example, a conic curved line, parabolic or circular curved line.

In an embodiment, the position adjustment of the first local adjusted one is performed manually by the user, for example. The user could operate the aforementioned user interface to adjust the position of the first local adjusted one.

As shown in FIG. 3I, the processor 120, for example, changes the positions of the first local adjusted one and the linking ones with a maximum amplitude change. For example, all open correction points on the first local adjusted one in the perpendicular direction are moved together (linked) with the first local adjusted one. If the maximum amplitude change is not expected by the user, the user could continue to move the first local adjusted one to a reset position RP of the correction frame M, for example, a center of the frame edge MF; however, such exemplification is not meant to be for limiting. In response to the first local adjusted one being moved to the reset position RP, the processor 120 changes the form of the line segment S1.

Furthermore, as shown in FIG. 3J, when the first open correction point $CP7_{,1}$ (the first local adjusted one) is moved to the reset position RP, the processor 120 reduces the number of the linking ones that are moved together with the first open correction point $CP7_{,1}$. For example, the number of the linking ones that are moved together with the first open correction point $CP7_{,1}$ (the first local adjusted one) is reduced to two from six, and the curvature radius of the line segment S1 is reduced (that is, the line segment S1 is farther from the reset position RP), and then, as the first open correction points $CP7_{,1}$ approaches the reset position RP, the curvature radius of the line segment S1 increases (that is, the line segment S1 approaches the reset position RP) and the number of the linking ones increases.

When the first local adjusted one meets the user's requirements, the user could end the local contour adjustment step, and the process directly proceeds to step S195 from step S192. In addition, the user could input an end command of the local contour adjustment, through the aforementioned user interface, to end the local contour adjustment process. If the user wants to continue to perform the second ($m^{th}$) local contour adjustment, the process proceeds to step S193.

In step S193, the processor 120 determines whether the local contour adjustment is completed. If the local contour adjustment is completed, the process proceeds to step S195; if the local contour adjustment is not completed, the process proceeds to step S194.

In step S194, the processor 120 accumulates the value of m, for example, m=m+1, and then the process returns to step S192 to continue next the $m^{th}$ local adjustment. The value of m could range between 1 and M, wherein m is a positive integer, and M is a positive integer equal to or greater than 2. The embodiment of the present invention does not limit the value of M, which could be a positive integer between 2 and 100, or even more, and the value depends on the number of adjustments made by the user.

In step S195, within the contour boundary line B1, the processor 120 could use a linear interpolation compensation method to establish a number of non-opened correction points, wherein the positions of the non-opened correction points are, for example, at the intersections of the grid-lines of FIG. 3J. The "non-opened correction point" herein refers to the contour point that is not open to the user for position adjustment. So far, the correction for the correction frame M is completed.

To sum up, an embodiment of the present invention provides an frame correction method and a projector using the same, which could project a correction frame for the user to adjust the boundary contour and/or the local contour in the boundary of the correction frame to meet the (or conform to) the surface contour (for example, flat, curved surface or the combination thereof) of the projection surface (for example, wall surface, landscaping surface, advertising surface, screen, or any surface that could receive the projection of the projected image), thereby reducing the degree of distortion and distortion of the display content. In other words, the projection image from the projector according to the embodiment of the present invention is not excessively distorted resulted from the concave and convex contours of the projection surface. In an embodiment, the user only needs to manually adjust $n^{th}$ contour-adjusted one, then the corresponding original-boundary contour point(s) and/or added-boundary contour point(s) is/are automatically adjusted, and at least one added-boundary contour point and at least one open correction point are automatically added. In another embodiment, the user could manually adjust the position of the $m^{th}$ local adjusted one of the at least one open correction point, and the linking one associated with the $m^{th}$ local adjusted one is moved together with the movement of the $m^{th}$ local adjusted one. As a result, by means of automatically adding image point(s) and automatically adjusting the position(s) of the image point(s), it could effectively save time for the user to correct the frame.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A frame correction method, comprises:
   projecting a correction frame, wherein the correction frame has a plurality of original-boundary contour points;
   in a first boundary contour adjustment, in response to a position adjustment of a first contour-adjusted one of the original-boundary contour points, correspondingly adjusting a position of at least one symmetric one of the original-boundary contour points, wherein the at least one symmetric one and the first contour-adjusted one are symmetrically disposed; and
   in response to the position adjustment of the first contour-adjusted one, adding a plurality of first added-boundary contour points and a plurality of first open correction points.

2. The frame correction method as claimed in claim 1, wherein the original-boundary contour points are distributed on a frame edge of the correction frame; in step of correspondingly adjusting the position of the at least one symmetric one of the original-boundary contour points, the at least one symmetric one and the first contour-adjusted one are symmetrically disposed relative to a first center line and a second center line, wherein the first center line and the second center line are perpendicular to each other, and an intersection point of the first center line and the second center line is a center point of the frame edge.

3. The frame correction method according to claim 1, wherein the original-boundary contour points are distributed on a frame edge of the correction frame, the first added-boundary contour points and the first open correction points are symmetrically disposed relative to a first center line and a second center line, the first center line and the second center line are perpendicular to each other, and an intersection point of the first center line and the second center line is a center point of the frame edge.

4. The frame correction method according to claim 1, wherein in step of correspondingly adjusting the position of the at least one symmetric one of the original-boundary contour points, a position of the first contour-adjusted one is adjusted in a boundary contour adjustment direction; step of adding the plurality of the first added-boundary contour points and the plurality of the first open correction points comprises:
    adding an added one of the first added-boundary contour points between the first contour-adjusted one and the original-boundary contour point adjacent to first contour-adjusted one, wherein the adjacent original-boundary contour point is the original-boundary contour point closest to the first contour-adjusted one in an added direction, wherein the added direction and the boundary contour adjustment direction are perpendicular to each other.

5. The frame correction method according to claim 4, wherein step of adding the plurality of the first added-boundary contour points and the plurality of the first open correction points comprises:
    adding the others of the first added-boundary contour points, wherein the added one of the first added-boundary contour points and the others of the first added-boundary contour points are symmetrically disposed.

6. The frame correction method according to claim 1, wherein step of adding the first added-boundary contour points and the first open correction points comprises:
    establishing a plurality of first added-boundary contour point lines, wherein each first added-boundary contour point line connects the opposite two first added-boundary contour points;
    establishing a plurality of first original-boundary contour point lines, wherein each first original-boundary contour point line connects the opposite two original-boundary contour points; and
    establishing the first open correction points at a plurality of intersections of the first added-boundary contour point lines and the first original-boundary contour point lines.

7. The frame correction method according to claim 1, further comprises:
    in the $n^{th}$ boundary contour adjustment, in response to a position adjustment of the $n^{th}$ contour-adjusted one of the original-boundary contour points and the first added-boundary contour points to a plurality of the $(n-1)^{th}$ added-boundary contour points, adding an added one of a plurality of the $n^{th}$ added-boundary contour points between the $n^{th}$ contour-adjusted one and an adjacent one of the original-boundary contour points and the first added-boundary contour points to the $(n-1)^{th}$ added-boundary contour points; and
    adding the others of the $n^{th}$ added-boundary contour points;
    wherein n is a positive integer equal to or greater than 2, and the added one of the $n^{th}$ added-boundary contour points and the others of the of the $n^{th}$ added-boundary contour points are symmetrically disposed.

8. The frame correction method according to claim 1, further comprises:
    generating a contour boundary line, wherein the contour boundary line connects the original-boundary contour points and the first added-boundary contour points.

9. The frame correction method according to claim 1, further comprises:
    in response to a secondary position adjustment of a released one of the original-boundary contour points, the first added-boundary contour points and the first open correction points, releasing a linking relationship between the released one and the others of the original-boundary contour points, the first added-boundary contour points and the first open correction points.

10. The frame correction method according to claim 1, further comprises:
    in response to a position adjustment of a first local adjusted one of the first open correction points in a local adjustment direction, correspondingly adjusting a position of a linking one of the first open correction points in the local adjustment direction;
    wherein the first local adjusted one and the linking one are distributed in a distribution direction, and the local adjustment direction is perpendicular to the distribution direction.

11. A projector, comprises:
    a projection module configured to project a projection image, wherein the projection image has a plurality of original-boundary contour points; and
    a processor configured to:
        in a first boundary contour adjustment, in response to a position adjustment of a first contour-adjusted one of the original-boundary contour points, correspondingly adjust a position of at least one symmetric one of the original-boundary contour points, wherein the at least one symmetric one and the first contour-adjusted one are symmetrically disposed; and
        in response to the position adjustment of the first contour-adjusted one, add a plurality of first added-boundary contour points and a plurality of first open correction points.

12. The projector according to claim 11, wherein the original-boundary contour points are distributed on a frame edge of the correction frame, the at least one symmetric one and the first contour-adjusted one are symmetrically disposed relative to a first center line and a second center line, the first center line and the second center line are perpendicular to each other, and an intersection point of the first center line and the second center line is a center point of the frame edge.

13. The projector according to claim 11, wherein the original-boundary contour points are distributed on a frame edge of the correction frame, the first added-boundary contour points and the first open correction points are symmetrically disposed relative to a first center line and a second center line, the first center line and the second center line are perpendicular to each other, and an intersection point of the first center line and the second center line is a center point of the frame edge.

14. The projector according to claim 11, wherein a position of the first contour-adjusted one is adjusted in a boundary contour adjustment direction; the processor is configured to:
    add an added one of the first added-boundary contour points between the first contour-adjusted one and the original-boundary contour point adjacent to first contour-adjusted one, wherein the adjacent original-boundary contour point is the original-boundary contour point closest to the first contour-adjusted one in an added direction, wherein the added direction and the boundary contour adjustment direction are perpendicular to each other.

15. The projector according to claim 14, wherein the processor is configured to:
    add the others of the first added-boundary contour points, wherein the added one of the first added-boundary contour points and the others of the first added-boundary contour points are symmetrically disposed.

16. The projector according to claim 11, wherein the processor is configured to:
    establish a plurality of first added-boundary contour point lines, wherein each first added-boundary contour point line connects the opposite two first added-boundary contour points;
    establish a plurality of first original-boundary contour point lines, wherein each first original-boundary contour point line connects the opposite two original-boundary contour points; and
    establish the first open correction points at a plurality of intersections of the first added-boundary contour point lines and the first original-boundary contour point lines.

17. The projector according to claim 11, wherein the processor is configured to:
    in the $n^{th}$ boundary contour adjustment, in response to a position adjustment of the $n^{th}$ contour-adjusted one of the original-boundary contour points and the first added-boundary contour points to a plurality of the $(n-1)^{th}$ added-boundary contour points, add an added one of a plurality of the $n^{th}$ added-boundary contour points between the $n^{th}$ contour-adjusted one and an adjacent one of the original-boundary contour points and the first added-boundary contour points to the $(n-1)^{th}$ added-boundary contour points; and
    add the others of the $n^{th}$ added-boundary contour points;
    wherein n is a positive integer equal to or greater than 2, and the added one of the $n^{th}$ added-boundary contour points and the others of the of the $n^{th}$ added-boundary contour points are symmetrically disposed.

18. The projector according to claim 11, wherein the processor is configured to:
    generate a contour boundary line, wherein the contour boundary line connects the original-boundary contour points and the first added-boundary contour points.

19. The projector according to claim 11, wherein the processor is configured to:
    in response to a secondary position adjustment of a released one of the original-boundary contour points, the first added-boundary contour points and the first open correction points, release a linking relationship between the released one and the others of the original-boundary contour points, the first added-boundary contour points and the first open correction points.

20. The projector according to claim 11, further comprises:
    in response to a position adjustment of a first local adjusted one of the first open correction points in a local adjustment direction, correspondingly adjust a position of a linking one of the first open correction points in the local adjustment direction;
    wherein the first local adjusted one and the linking one are distributed in a distribution direction, and the local adjustment direction is perpendicular to the distribution direction.

* * * * *